(12) United States Patent
Gredoña et al.

(10) Patent No.: US 11,055,348 B2
(45) Date of Patent: Jul. 6, 2021

(54) SYSTEMS AND METHODS FOR AUTOMATICALLY GENERATING STITCHED MEDIA CONTENT

(71) Applicant: Facebook, Inc., Menlo Park, CA (US)

(72) Inventors: Clark Martin Gredoña, New York, NY (US); Chun-Yu Tsai, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 244 days.

(21) Appl. No.: 15/858,431

(22) Filed: Dec. 29, 2017

(65) Prior Publication Data

US 2019/0205405 A1    Jul. 4, 2019

(51) Int. Cl.
G06F 7/00       (2006.01)
G06F 16/00      (2019.01)
G06F 16/783     (2019.01)
G06F 16/71      (2019.01)
G06F 16/901     (2019.01)
G06Q 50/00      (2012.01)

(52) U.S. Cl.
CPC .......... *G06F 16/7837* (2019.01); *G06F 16/71* (2019.01); *G06F 16/783* (2019.01); *G06F 16/9024* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 9,324,172 B2* | 4/2016 | Wu | H04N 5/23229 |
| 2013/0071031 A1* | 3/2013 | Huang | G11B 27/034 |
| | | | 382/190 |
| 2013/0124984 A1* | 5/2013 | Kuspa | H04N 21/4307 |
| | | | 715/255 |
| 2013/0343597 A1* | 12/2013 | Kocks | G06F 16/738 |
| | | | 382/100 |
| 2014/0111605 A1* | 4/2014 | Guo | G06T 3/4038 |
| | | | 348/36 |
| 2014/0377732 A1* | 12/2014 | Freedman | G09B 5/10 |
| | | | 434/322 |
| 2016/0373639 A1* | 12/2016 | Westmacott | H04N 5/23206 |
| 2018/0122078 A1* | 5/2018 | Polavarapu | G06T 3/4038 |

* cited by examiner

*Primary Examiner* — Tuan A Pham
(74) *Attorney, Agent, or Firm* — Sheppard Mullin Richter & Hampton LLP

(57) ABSTRACT

Systems, methods, and non-transitory computer-readable media can identify a set of videos. One or more overlapping portions in the set of videos are automatically identified. A stitched media content item is automatically generated based on the one or more overlapping portions and at least a subset of the set of videos.

20 Claims, 9 Drawing Sheets

SYSTEMS AND METHODS FOR AUTOMATICALLY GENERATING STITCHED MEDIA CONTENT

FIELD OF THE INVENTION

The present technology relates to the field of content generation. More particularly, the present technology relates to techniques for automatically creating and sharing digital content in a computer networking environment.

BACKGROUND

Users often utilize computing devices for a wide variety of purposes. Users can use their computing devices to, for example, interact with one another, access media content, share media content, and create media content. In some cases, media content can be provided by members of a social networking system. The media content can include one or a combination of text, images, videos, and audio. The media content may be published to the social networking system for consumption by others.

SUMMARY

Various embodiments of the present disclosure can include systems, methods, and non-transitory computer readable media configured to identify a set of videos. One or more overlapping portions in the set of videos are automatically identified. A stitched media content item is automatically generated based on the one or more overlapping portions and at least a subset of the set of videos.

In an embodiment, a directed acyclic graph is automatically generated based on the one or more overlapping portions.

In an embodiment, the directed acyclic graph comprises a plurality of nodes and a plurality of edges connecting the plurality of nodes. Each node of the plurality of nodes is associated with a respective video from the set of videos. Each edge of the plurality of edges is associated with an overlapping portion of the one or more overlapping portions.

In an embodiment, the directed acyclic graph is traversed to identify a path of traversal resulting in a longest length for the stitched media content item.

In an embodiment, the path of traversal comprises a set of nodes of the plurality of nodes, the set of nodes being associated with one or more videos from the set of videos, and the stitched media content item comprises visual content from each video of the one or more videos.

In an embodiment, the automatically identifying the one or more overlapping portions in the set of videos comprises identifying one or more overlapping audio portions in the set of videos.

In an embodiment, the identifying the set of videos comprises identifying a set of related videos.

In an embodiment, each video in the set of related videos is associated with a particular event.

In an embodiment, the identifying the set of related videos comprises querying a database for videos associated with the particular event.

In an embodiment, each video of the set of videos is a video uploaded by a user to a social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
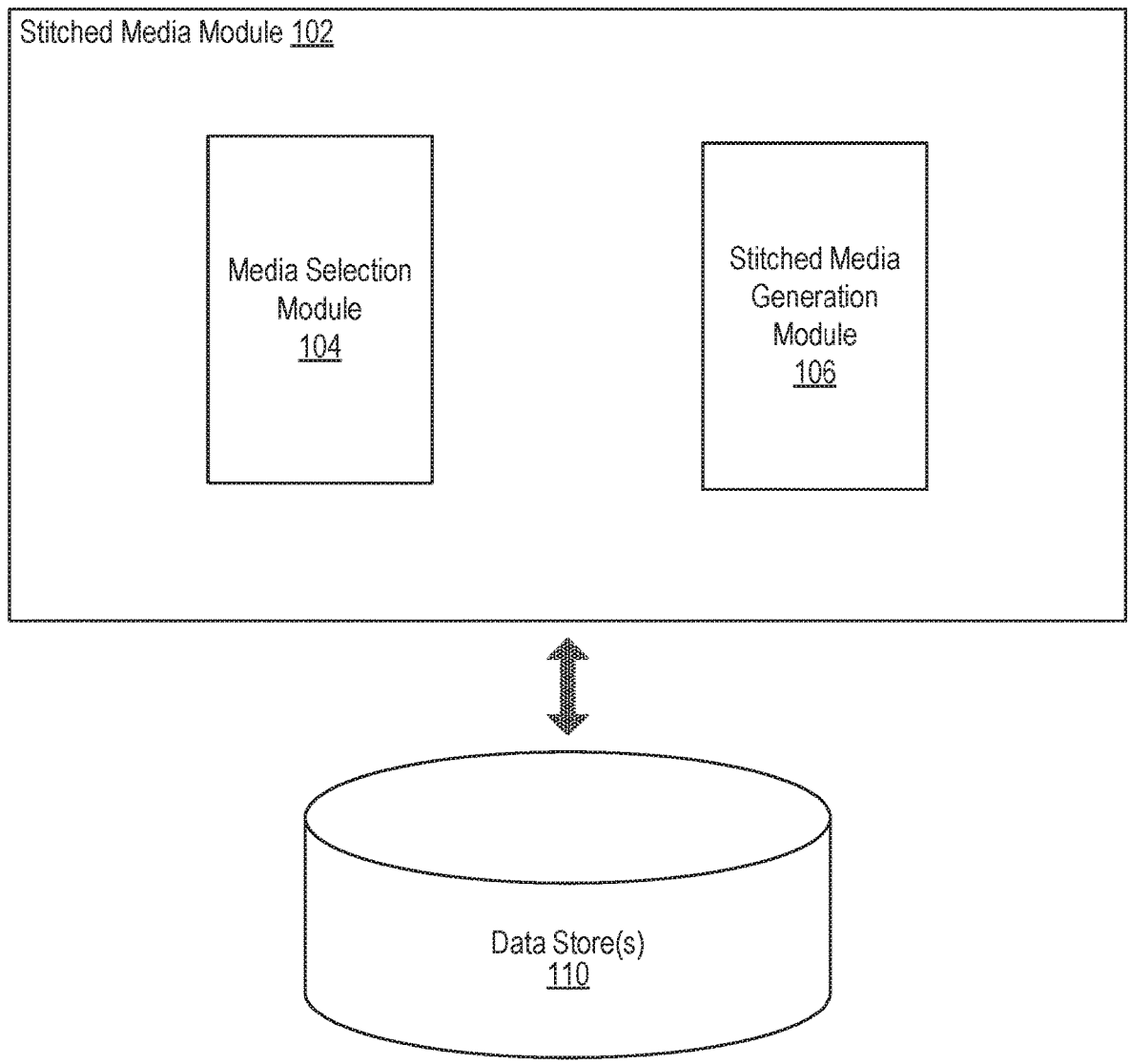
FIG. 1 illustrates an example system including a stitched media module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches For Automatically Generating Content

As mentioned, users often utilize computing devices for a wide variety of purposes. Users can use their computing devices to, for example, interact with one another, access media content, share media content, and create media content. In some cases, media content items can include postings (i.e., content posts) from members of an online community or platform, such as a social networking system, or postings by the social networking system itself. The content posts may include one or a combination of text, images, videos, and audio. The content posts may be published to the social networking system for consumption by others. Under conventional approaches, content posts posted by a member can be included in a profile of the member on the social networking system. In other instances, content posts posted to a social networking system can appear in respective media content feeds of users who are members of the social networking system. In certain instances, users can be connections of a member who posted the content posts.

Under conventional approaches, users can create and publish content to a social networking system. Such content posts can include text, media (e.g., images, videos, audio), or a combination thereof. Other users can access the published content posts through the social networking system. Under conventional approaches, users may be provided with various features or tools to generate content. For example, these features and tools may be provided via a user interface on a mobile application or web browser. Users can interact with the user interface to generate content and publish it to the social networking system. In other instances, a social networking system may post content for consumption by its users. However, conventional approaches for generating and sharing content posts, either by users or by a social networking system, can be inadequate for various reasons. For example, conventional approaches may provide tools or features for users to create content based on their own content items (e.g., photos or videos), but may not provide ways for multiple users to combine their content items in interesting ways. In another example, conventional approaches may not enable content items that adequately capture shared experiences between a plurality of users.

An improved approach rooted in computer technology overcomes the foregoing and other disadvantages associated with conventional approaches specifically arising in the realm of computer technology. In general, a plurality of related videos can be identified. In various embodiments, the plurality of related videos can be generated or provided by a plurality of users. For example, the plurality of related videos can comprise a plurality of videos taken by various users attending an event. Overlapping portions of the plurality of videos can be determined. In various embodiments, overlapping portions of videos can be determined based on an analysis of audio components of the videos to identify overlapping audio portions. Based on the identified overlapping portions, a set of candidate videos can be identified from the plurality of related videos. The set of candidate videos, or a subset, can be stitched together to generate a stitched media content item (e.g., a stitched video). In one embodiment, a stitched media content item can comprise a substantially continuous audio component. The stitched media content item can also comprise a visual component which comprises visual content from a plurality of media content items (e.g., a plurality of videos). More details relating to the disclosed technology are provided below.

FIG. 1 illustrates an example system 100 including a stitched media module 102, according to an embodiment of the present disclosure. The stitched media module 102 can identify a set of videos that are related to one another. The stitched media module 102 can identify overlapping portions in the set of videos. In certain embodiments, the stitched media module 102 can identify overlapping portions in two videos, by identifying any portions of the two videos that have substantially identical audio components. Based on the identification of the overlapping portions in the set of videos, the stitched media module 102 can identify a set of candidate videos from the set of videos. Each video in the set of candidate videos can include at least one portion that overlaps with a portion of another video in the subset of candidate videos. The stitched media module 102 can stitch the set of candidate videos together to generate a stitched media content item (e.g., a stitched video). In an embodiment, the stitched media content item can include an audio component and a visual component. In certain embodiments, the set of candidate videos can be stitched together such that the audio component of the stitched media content item is substantially continuous, and such that the visual component comprises visual content from a plurality of videos. The stitched media content item can be provided to one or more users for consumption. For example, the stitched media content item can be published to a social networking system for consumption by users of the social networking system.

As shown in the example of FIG. 1, the stitched media module 102 can include a media selection module 104 and a stitched media generation module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the stitched media module 102 can be implemented in any suitable combinations.

In some embodiments, the stitched media module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the stitched media module 102 can be, in part or in whole, implemented as software running on one or more computing devices or systems, such as on a server system or a client computing device. In some instances, the stitched media module 102 can be, in part or in whole, implemented within or configured to operate in conjunction with or be integrated with a social networking system (or service), such as a social networking system 630 of FIG. 6. Likewise, in some instances, the stitched media module 102 can be, in part or in whole, implemented within or configured to operate in conjunction with or be integrated with a client computing device, such as the user device 610 of FIG. 6. For example, the stitched media module 102 can be implemented as or within a dedicated application (e.g., app), a program, or an applet running on a user computing device or client computing system. The application incorporating or implementing instructions for performing functionality of the stitched media module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The stitched media module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the stitched media module 102. For example, the data store 110 can store a plurality of media content items, association information relating various sets of media content items to one another, one or more stitched media content items, and the like. It is contemplated that there can be many variations or other possibilities.

The media selection module 104 can be configured to identify a set of candidate videos to be used to generate a stitched media content item. In certain embodiments, the media selection module 104 can identify a set of videos that are related in some way. A set of videos may be related, for example, based on a shared association with a particular event. The media selection module 104 can identify any overlapping portions in the set of videos. In certain embodiments, overlapping portions in two videos may be identified based on whether any portion of an audio component of a first video matches any portion of an audio component of a second video. Based on the overlapping portions identified in the set of videos, the media selection module 104 can identify a set of candidate videos. Each video in the set of candidate videos can comprise at least one portion that overlaps with a portion of at least one other video in the set of candidate videos. More details regarding the media selection module 104 will be provided below with reference to FIG. 2.

The stitched media generation module 106 can be configured to generate a stitched media content item, such as a stitched video. The stitched media generation module 106 can receive a set of candidate videos from the media selection module 104. The stitched media generation module 106 can stitch at least some of the videos from the set of candidate videos together to create a stitched media content item. In some embodiments, the stitched media generation module 106 can stitch a set of candidate videos together in such a way that the resulting stitched media content item has a substantially continuous audio component, and has a visual component that comprises visual content from a plurality of different videos. More details regarding the stitched media generation module 106 will be provided below with reference to FIG. 3.

Figure 2:
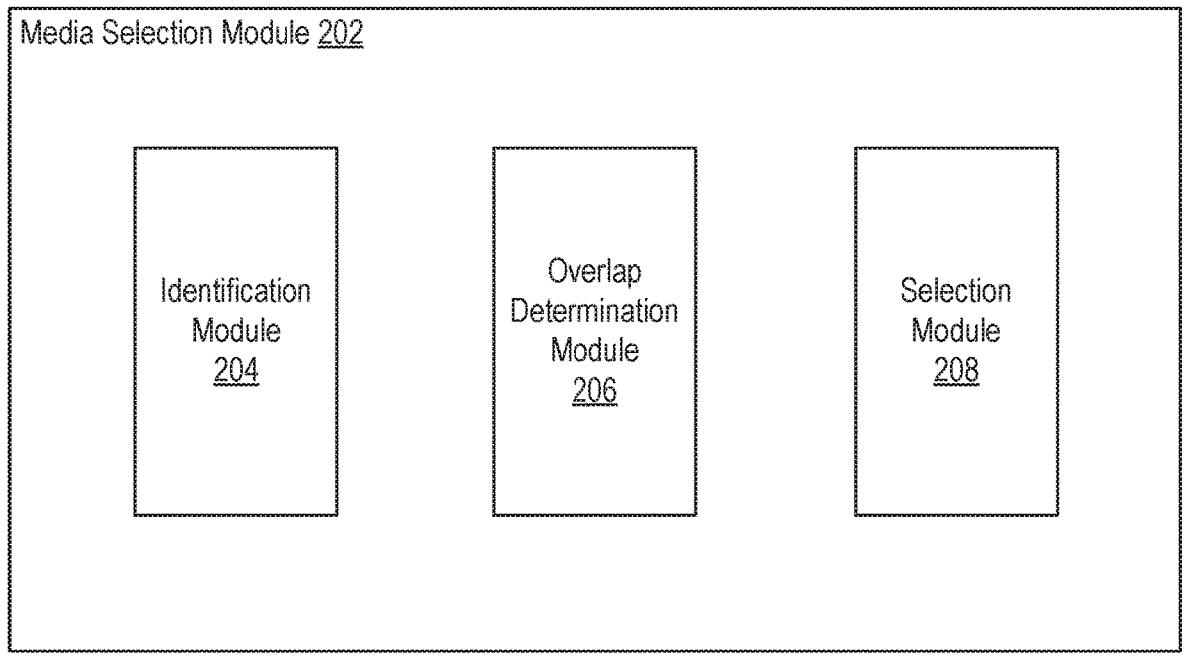
FIG. 2 illustrates an example media selection module, according to an embodiment of the present disclosure.

FIG. 2 illustrates an example media selection module 202 configured to select a set of videos to be used in generating a stitched media content item, according to an embodiment of the present disclosure. In some embodiments, the media selection module 104 of FIG. 1 can be implemented as the media selection module 202. As shown in the example of FIG. 2, the media selection module 202 can include an identification module 204, an overlap determination module 206, and a selection module 208.

The identification module 204 can be configured to identify a set of videos that are related to one another in one or more ways (i.e., a set of related videos). A set of related videos may be related to one another, for example, based on a shared association with a particular event. For example, one or more users of a social networking system can upload videos from a particular event, such as a concert. Each video can be tagged with information indicating that the video is associated with the concert. In certain embodiments, the identification module 204 can be configured to query a database of media content items to identify a set of videos associated with a particular event. The database may comprise, for example, a set of media content items that have been uploaded to a social networking system by a plurality of users. In some embodiments, an association between a video and an event may be specified by a user. For example, a user uploading a video can add a tag to the video indicating that the video was taken at a particular event. In some embodiments, an association between a video and an event may be determined automatically. For example, a video can be associated with location information indicating a location in which the video was captured, and time information indicating a time at which the video was captured. If the location information and the time information for the video correspond to a particular event, the video can be automatically associated with the event.

The overlap determination module 206 can be configured to automatically identify overlapping portions in a set of videos. In an embodiment, the overlap determination module 206 can receive a set of related videos from the identification module 204. The overlap determination module 206 can automatically identify any overlapping portions in the set of related videos. In certain embodiments, the overlap determination module 206 can identify overlapping portions of two videos based on audio components of the two videos. Identification of overlapping portions of two videos can be based on any suitable conventional audio processing technique to identify similarity or identity between matching audio components of the two videos. For example, consider an example scenario in which a first user and a second user attending the same concert each filmed a video of a performer singing a particular song. The first user started filming his or her video at the beginning of the song (i.e., t=0) and stopped filming 60 seconds into the song (i.e., t=60). The second user started filming his or her video thirty seconds into the song (i.e., t=30) and stopped filming 75 seconds into the song (i.e., t=75). From t=30 to t=60, the two users were both filming the same subject matter. As such, it would be expected that the final thirty seconds of the first user's video and the first thirty seconds of the second user's video would have audio components that are substantially identical. Based on the substantially identical audio components in the two videos, the overlap determination module 206 can be configured to determine that the last thirty seconds of the first user's video overlap with the first thirty seconds of the second user's video.

In certain embodiments, the overlap determination module 206 can be configured to automatically determine overlapping portions in videos based on visual characteristics, or visual components, of the videos. Identification of overlapping portions of two videos can be based on any suitable conventional video processing technique to identify similarity or identity between matching video components of the two videos. For example, if a first visual portion of a first video is determined to be substantially similar to a second visual portion of a second video such that the two visual portions satisfy a similarity threshold, a first portion of the first video corresponding to the first visual portion can be determined to overlap with a second portion of the second video corresponding to the second visual portion. In certain embodiments, other signals can be used to identify overlapping portions in videos. In one example, the overlap determination module 206 can identify overlapping portions based on time information associated with videos. For example, if a first, one minute video has time information indicating that the video was captured from precisely 7:30 p.m. EST until precisely 7:31 p.m. EST, and a second five minute video has time information indicating that the second video was captured from precisely 7:30 p.m. EST until precisely 7:35 p.m. EST, the overlap determination module 206 can determine that the first minute of the second video overlaps with the entirety of the first video. In various embodiments, multiple signals (e.g., audio signals, visual signals, time signals, etc.) can be combined to automatically identify overlapping portions of videos. Many variations are possible.

The selection module 208 can be configured to automatically select a set of candidate videos to be used in generating a stitched media content item. The selection module 208 can receive overlapping portion information from the overlap determination module 206 comprising information describing overlapping portions of a set of videos. In certain embodiments, the selection module 208 can generate a directed acyclic graph based on the overlapping portions identified by the overlap determination module 206. The directed acyclic graph can comprise a plurality of nodes, each node representing a respective video of a set of videos. The directed acyclic graph can also comprise a plurality of edges connecting the plurality of nodes. An edge between two nodes can represent an overlapping portion between the two videos associated with the two nodes. Furthermore, the plurality of nodes in the directed acyclic graph can be sorted and/or ordered based on start times of the set of videos represented by the plurality of nodes. For example, an edge from a first node associated with a first video to a second node associated with a second video can indicate that the first video has a start time that is earlier than a start time for the second video. By generating a directed acyclic graph in this manner, the directed acyclic graph can be configured such that each path traversing a plurality of nodes along the edges defines a potential stitched media content item that can be created using the set of videos. In an embodiment, the selection module 208 can automatically select a set of candidate videos for generating a stitched media content item based on traversal of the directed acyclic graph.

In various embodiments, the selection module 208 can identify a set of candidate videos based on one or more selection criteria by utilizing various graph traversal approaches. The various nodes and/or edges in the directed acyclic graph can store or be associated with various types of information based on what is required in order to implement the selection criteria. For instance, the selection module 208 can be configured to identify a set of candidate videos in order to generate a longest possible stitched media content item. For example, a first path in the directed acyclic graph comprising a first set of nodes may result in a stitched media content item that results in a stitched media content item having a first length (e.g., 30 seconds), while a second path in the directed acyclic graph comprising a second set of nodes may result in a stitched media content item having a second length that is longer than the first length (e.g., 60 seconds). In this scenario, the selection module 208 can be configured to select the second path so that a sixty second stitched media content item is generated instead of a thirty second stitched media content item. In this example, each node and/or edge can store length information so that the selection module 208 can optimize for stitched media content item length. For example, each node can be associated with a particular video and can store the length of the video, and each edge can represent an overlap between two videos, and each edge can store a length of the overlap between the two videos.

In another example, the selection module 208 can identify a set of candidate videos in order to maximize or minimize a number of videos included in the stitched media content item. In yet another example, the selection module 208 can identify a set of candidate videos in order to generate a longest possible stitched media content item while implementing a minimum or maximum clip length threshold. For example, consider an example scenario in which a first path in the directed acyclic graph results in ten videos being selected for a stitched media content item, but the overlapping portions of the ten videos only allow each video to be shown for one second. However, if a minimum clip length threshold specifies that each video clip should be shown for a minimum of three seconds, the first path would not satisfy this requirement and the first path could not be used. Instead, a second path comprising only five videos may be selected based on a determination that the five videos create the longest possible stitched media content item while also satisfying the minimum clip length threshold requirement.

In certain embodiments, the selection module 208 can identify a set of candidate videos based on user characteristics of one or more users associated with each video. For example, each video in a set of videos may be uploaded by a user or otherwise associated with a user. Each user may have a number of followers or a number of connections on a social networking system. The selection module 208 can be configured to identify a set of candidate videos in order to maximize a number of followers of the users that uploaded the set of candidate videos. In this scenario, each node in the directed acyclic graph can store user follower information such that the selection module 208 can optimize based on number of followers.

Various potential selection criteria have been discussed. It should be appreciated that the selection module 208 can be configured to implement any of the example selection criteria individually or in any combinations. Many variations are possible.

Figure 3:
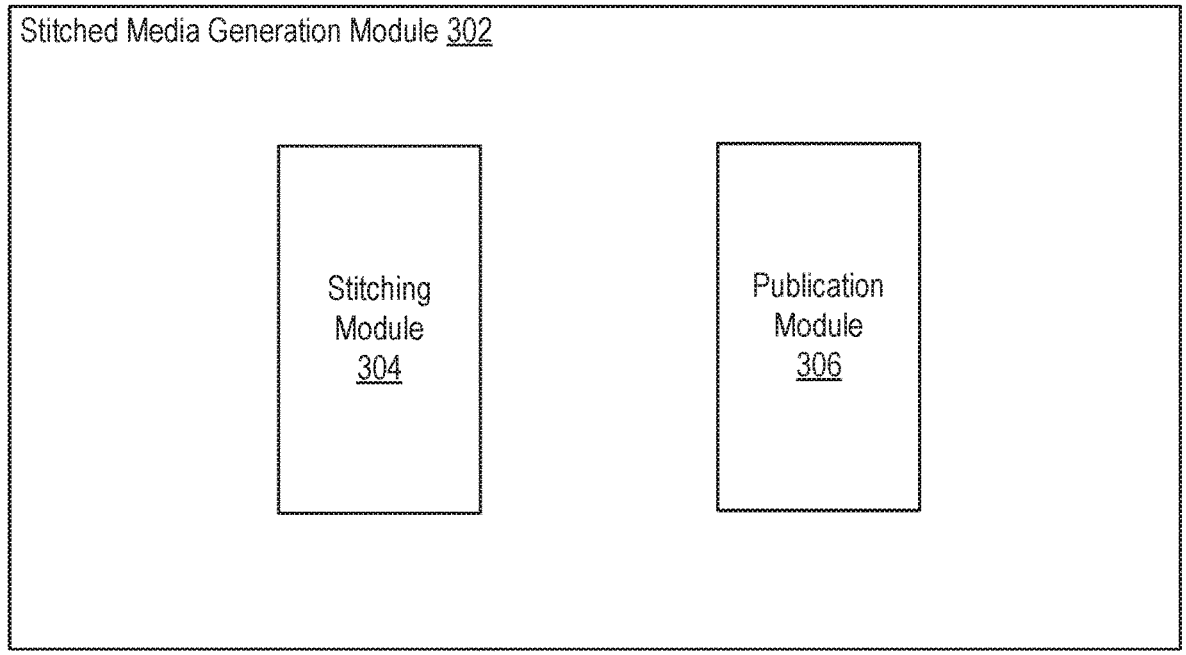
FIG. 3 illustrates an example stitched media generation module, according to an embodiment of the present disclosure.

FIG. 3 illustrates an example stitched media generation module 302 configured to automatically generate a stitched media content item based on a set of candidate videos, according to an embodiment of the present disclosure. In some embodiments, the stitched media generation module 106 of FIG. 1 can be implemented as the stitched media generation module 302. As shown in the example of FIG. 3, the stitched media generation module 302 can include a stitching module 304 and a publication module 306.

The stitching module 304 can be configured to automatically stitch together a set of candidate videos in order to generate a stitched media content item. As discussed above, a selection module 208 can be configured to identify a set of candidate videos. Each video in the set of candidate videos can include at least one portion that overlaps with a portion of at least one other video in the set of candidate videos. The stitching module 304 can be configured to automatically stitch together some or all of the videos in the set of candidate videos to generate a stitched media content item.

It can be appreciated that if two videos contain an overlapping portion, the two videos can be stitched together at any point within the overlapping portion. In other words, if a first video has a first portion that overlaps with a second portion in a second video, the first portion and the second portion jointly define an "overlapping portion" and the first video can be stitched together with the second video at any point within that overlapping portion. The point at which two videos are stitched together may be referred to herein as a stitching point. For example, consider an example scenario in which a first video is 30 seconds long, a second video is 20 seconds long, and the final ten seconds of the first video has an audio component that is substantially identical to the first ten seconds of the second video. In this case, it can be determined that the final ten seconds of the first video overlap with the first ten seconds of the second video. The first and second videos can be stitched together at any point within that ten second window. For example, if the two videos are stitched together three seconds into the ten second window, the final seven seconds of the first video can be cropped and the first three seconds of the second video can be cropped. The resulting two video clips can be stitched together to create a stitched media content item that is 40 seconds long, has a substantially continuous audio component, and has a visual component comprising visual content from the first video for the first 23 seconds, and visual content from the second video for the final 17 seconds.

The stitching module 304 can be configured to automatically determine stitching points for stitching together a set of videos. For example, the stitching module 304 can stitch two videos together where an overlapping portion starts, where an overlapping portion ends, at a halfway point of an overlapping portion, or any other point within an overlapping portion. In certain embodiments, the stitching module 304 can determine a stitching point for two videos based on a minimum or maximum clip length threshold. For example, the stitching module 304 can identify a stitching point for two videos in order to satisfy a minimum or maximum clip length threshold. For instance, a minimum clip length threshold may specify that each video clip in a stitched media content item should be at least two seconds long. The stitching module 304 can select stitching points for a set of videos such that each video included in the stitched media content item is presented for at least two seconds.

The publication module 306 can be configured to post (i.e., publish) content items, such as stitched media content items, to, for example, a social networking system. In some embodiments, content items may be shared as stories in a story feed or in one or more other content feeds. In some embodiments, content included in a story feed is treated as ephemeral content. That is, content included in the story feed can be available to other users for a limited duration of time, i.e., the content is temporarily available. In some embodiments, content included in other content feeds may be treated as non-ephemeral content. That is, the content can be available to other users for some longer or indefinite duration of time. These time periods can be predefined by the social networking system or, in some embodiments, by a user posting the content item. In some embodiments, a content item posted in a non-ephemeral content feed can be available through the social networking system until the content item is deleted by the user. In various embodiments, a stitched media content item can be published to a user's story feed, a story feed created by and/or associated with the social networking system, one or more video channels created by the social networking system, or to one or more other non-ephemeral content feeds.

Figure 4A:
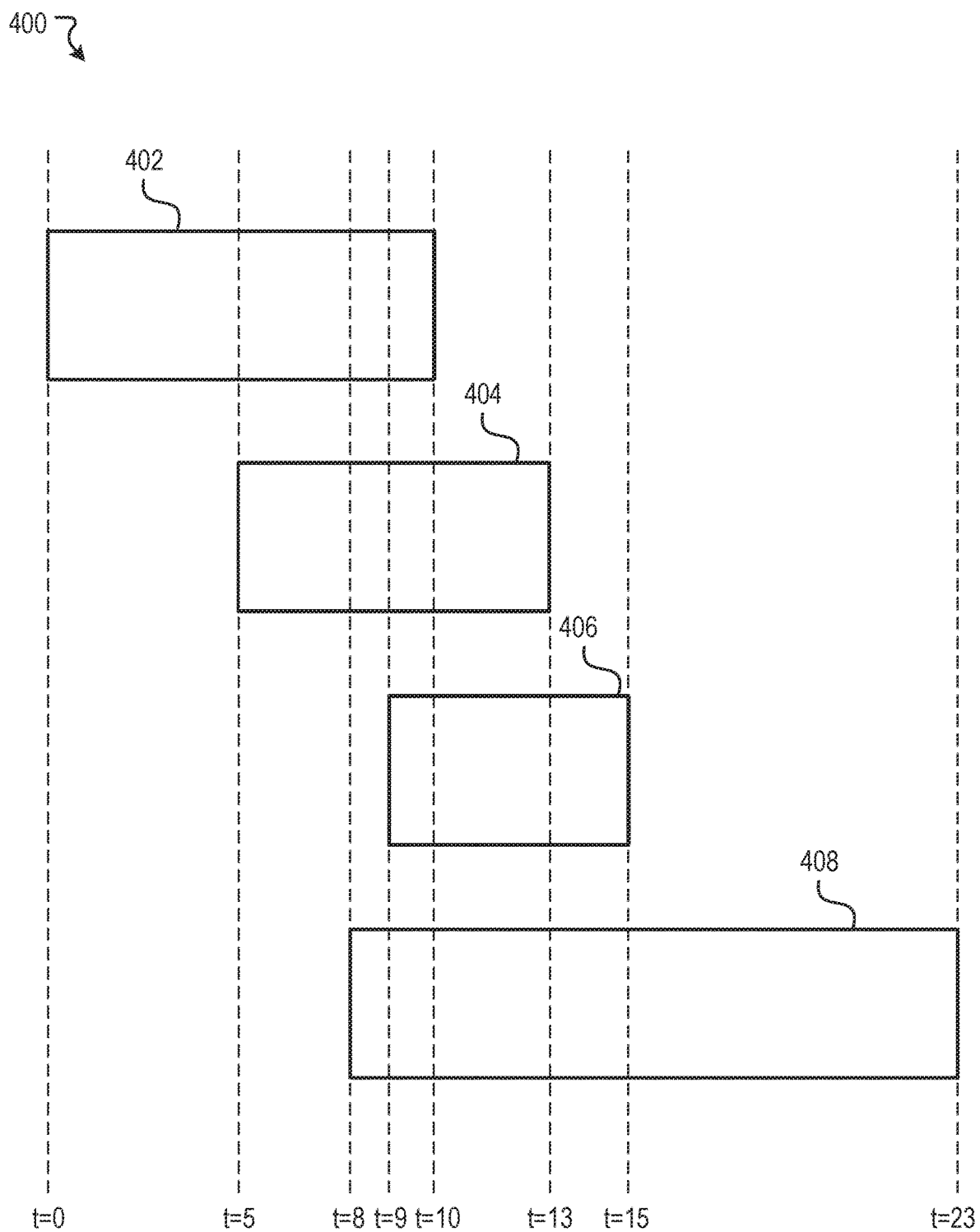
FIG. 4A illustrates an example scenario associated with automatically generating stitched media, according to an embodiment of the present disclosure.

FIG. 4A illustrates an example scenario 400 associated with automatically generating a stitched media content item based on the stitched media module 102, according to an embodiment of the present disclosure. The example scenario 400 includes four videos 402, 404, 406, 408. The four videos 402, 404, 406, 408 have been captured at the same event, and at roughly the same time, such that the four videos overlap with one another. A first video 402 is ten seconds long, and extends from t=0 seconds to t=10 seconds. A second video 404 is eight seconds long, and extends from t=5 seconds to t=13 seconds. As such, the second video 404 overlaps with the first video from t=5 to t=10. The two videos have substantially identical audio components for those five seconds, but may have different video components. For example, this may be the case if the two users were filming the same concert at roughly the same time, but from different parts of the concert venue.

A third video 406 is six seconds long, and extends from t=9 to t=15. The third video 406 overlaps with the first video 402 for one second from t=9 to t=10, and overlaps with the second video 404 for four seconds from t=9 to t=13.

A fourth video 408 is fifteen seconds long, and extends from t=8 to t=23. As can be seen in FIG. 4A, the fourth video 408 overlaps with all three of the other videos 402, 404, 406.

Figure 4B:
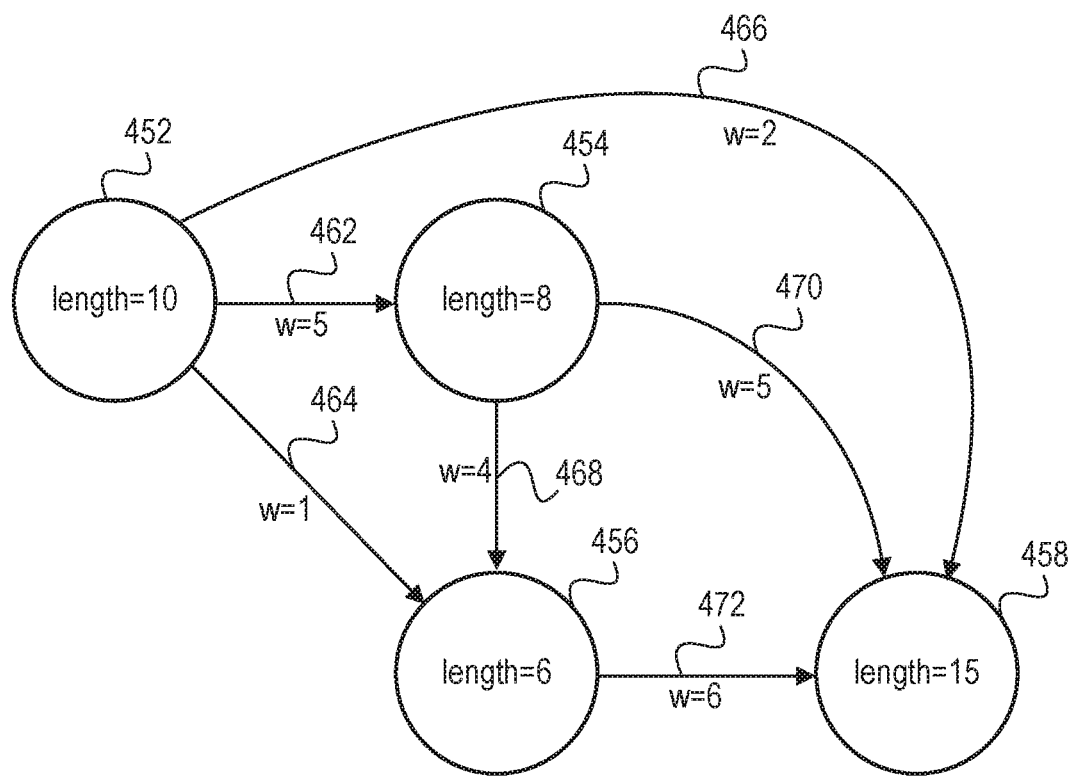
FIG. 4B illustrates an example directed acyclic graph, according to an embodiment of the present disclosure.

FIG. 4B illustrates an example directed acyclic graph 450 which has been generated based on the stitched media module 102, according to an embodiment of the present disclosure. The directed acyclic graph 450 represents the four videos 402, 404, 406, 408 from FIG. 4A. A first node 452 is associated with the first video 402, a second node 454 is associated with the second video 404, a third node 456 is associated with the third video 406, and a fourth node 458 is associated with the fourth video 408. A plurality of edges 462, 464, 466, 468, 470, 472 represent overlapping portions between the various videos. Each node 452, 454, 456, 458 stores length information for its respective associated video. Each edge stores length information indicative of a length of an overlap between two connected nodes/videos. For example, a first edge 462 connecting node 452 and node 454 has a weight of 5 indicating that the first video 402 (associated with the node 452) and the second video 404 (associated with the node 454) have five seconds of overlap. Similarly, a second edge 464 connecting node 452 and node 456 has a weight of 1, indicating that the first video 402 and the third video 406 have one second of overlap. Each path of traversal of the directed acyclic graph 450 represents a potential stitched media content item that can be generated using the four videos 402, 404, 406, 408.

The directed acyclic graph 450 can be traversed to identify an optimal set of candidate videos to generate a stitched media content item based on various selection criteria which optimize for various features. For example, in one instance, selection criteria may be configured to select candidate videos in order to maximize a length of the stitched media content item while minimizing a number of videos included in the stitched media content item. In this instance, the optimal path of traversal would be from node 452 to node 458 via edge 466. This path of traversal results in a stitched media content item that is 23 seconds long while including only two videos. Conversely, in a second instance, selection criteria can be configured to select candidate videos in order to maximize a length of the stitched media content item while maximizing a number of videos included in the stitched media content item. In this case, the optimal path of traversal would be from node 452 to node 454 via edge 462, from node 454 to node 456 via edge 468, and from node 456 to node 458 via edge 472. This path results in a stitched media content item that is, once again, 23 seconds long, but includes all four videos.

Figure 4C:
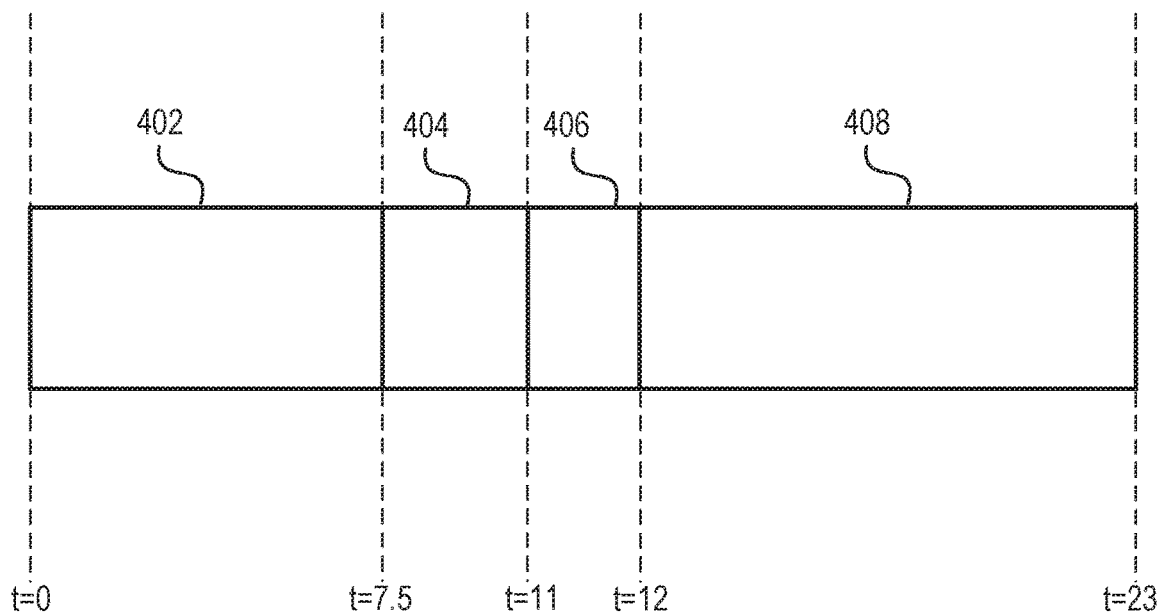
FIG. 4C illustrates an example stitched media content item, according to an embodiment of the present disclosure.

FIG. 4C illustrates an example stitched media content item 480 that has been automatically generated based on the stitched media module 102, according to an embodiment of the present disclosure. The example stitched media content item 480 combines the four videos 402, 404, 406, 408 of FIG. 4A into a single video. In this example scenario, the stitching point for each video was selected based on a midpoint of an overlapping portion. The first video 402 has been cropped at t=7.5 because t=7.5 represents the midpoint of the overlapping portion between the first video 402 and the second video 404. The second video 404 has been cropped at a front end at t=7.5, and has been cropped at a back end at t=11 because t=11 represents the midpoint of the overlapping portion between the second video 404 and the third video 406. The third video 406 has been cropped at a front end at t=11 and has been cropped at a back end at t=12 because t=12 represents a midpoint of the overlapping portion between the third video 406 and the fourth video 408. The fourth video has been cropped at its front end at t=12, and then plays through to its conclusion at t=23. It can be appreciated, as described above, that different stitching points can be selected. The stitched media content item 480 has a substantially continuous audio component, while including visual content from four different videos 402, 404, 406, 408. For example, the four different videos 402, 404, 406, 408 may represent four videos captured by four different users at the same concert during the same song. The 23 second long stitched media content item plays through 23 seconds of the song, while transitioning visually from one video to the next at each stitching point.

Figure 5:
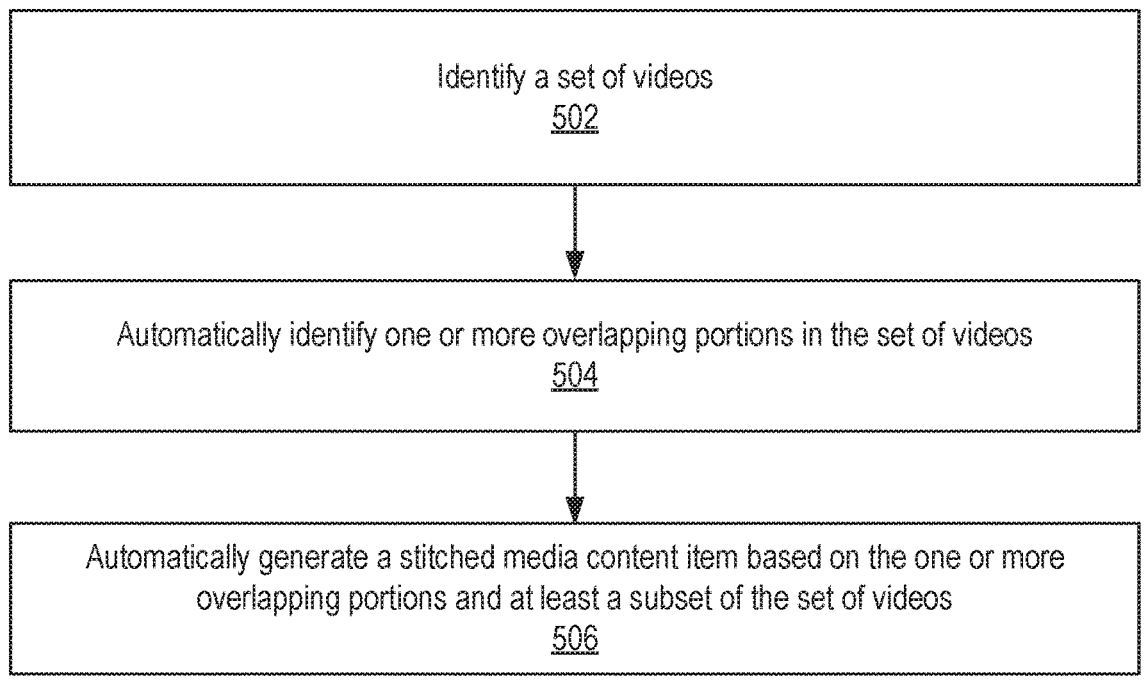
FIG. 5 illustrates an example method associated with automatically generating stitched media, according to an embodiment of the present disclosure.

FIG. 5 illustrates an example method 500 associated with automatically generating stitched media content items, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can identify a set of videos. At block 504, the example method 500 can automatically identify one or more overlapping portions in the set of videos. At block 506, the example method 500 can automatically generate a stitched media content item based on the one or more overlapping portions and at least a subset of the set of videos.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
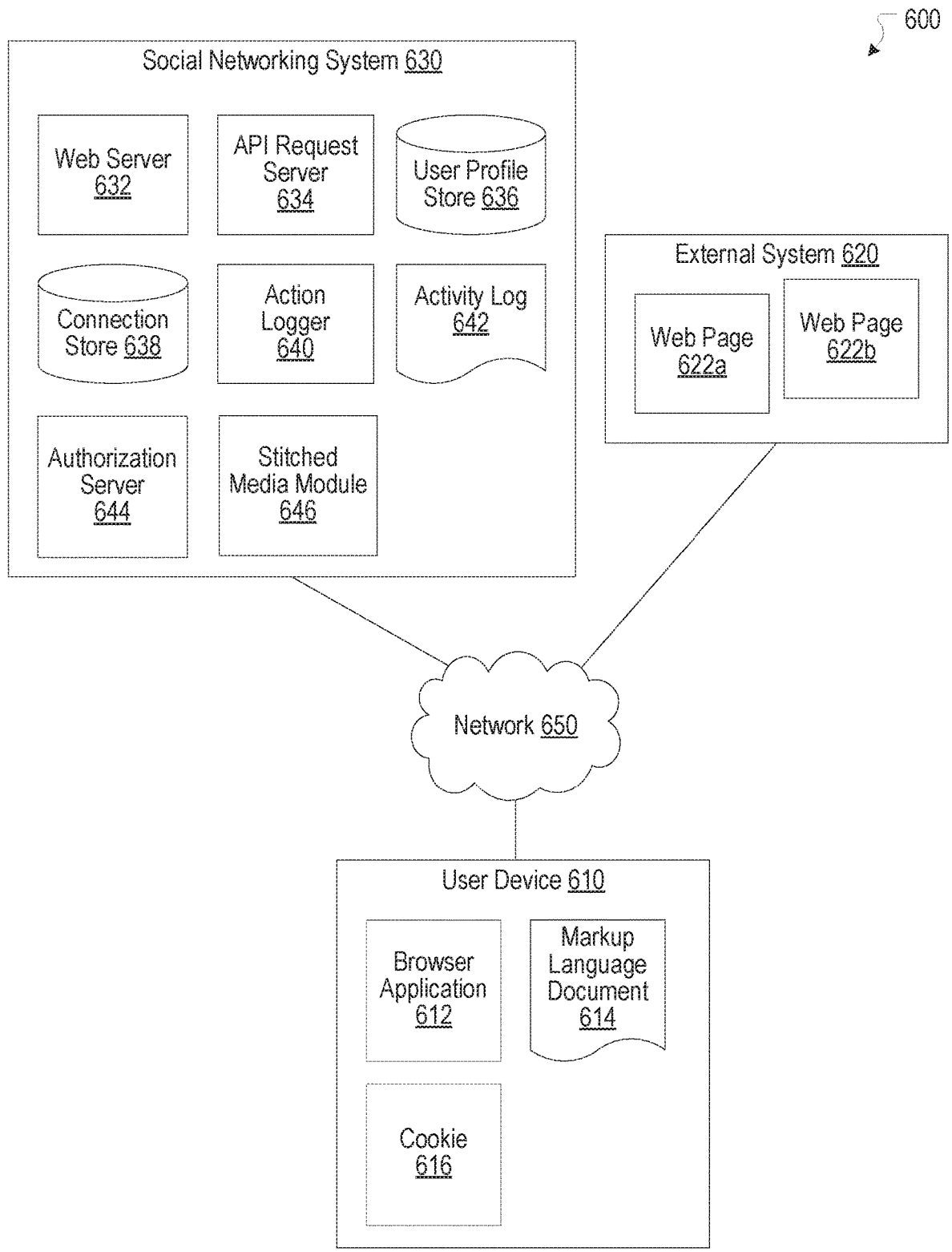
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622_a_ within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a stitched media module 646. The stitched media module 646 can, for example, be implemented as the stitched media module 102, as discussed in more detail herein. As discussed previously, it should be appreciated that there can be many variations or other possibilities. For example, in some embodiments, one or more functionalities of the stitched media module 646 can be implemented in the user device 610. As discussed previously, it should be appreciated that there can be many variations or other possibilities.

Hardware Implementation

Figure 7:
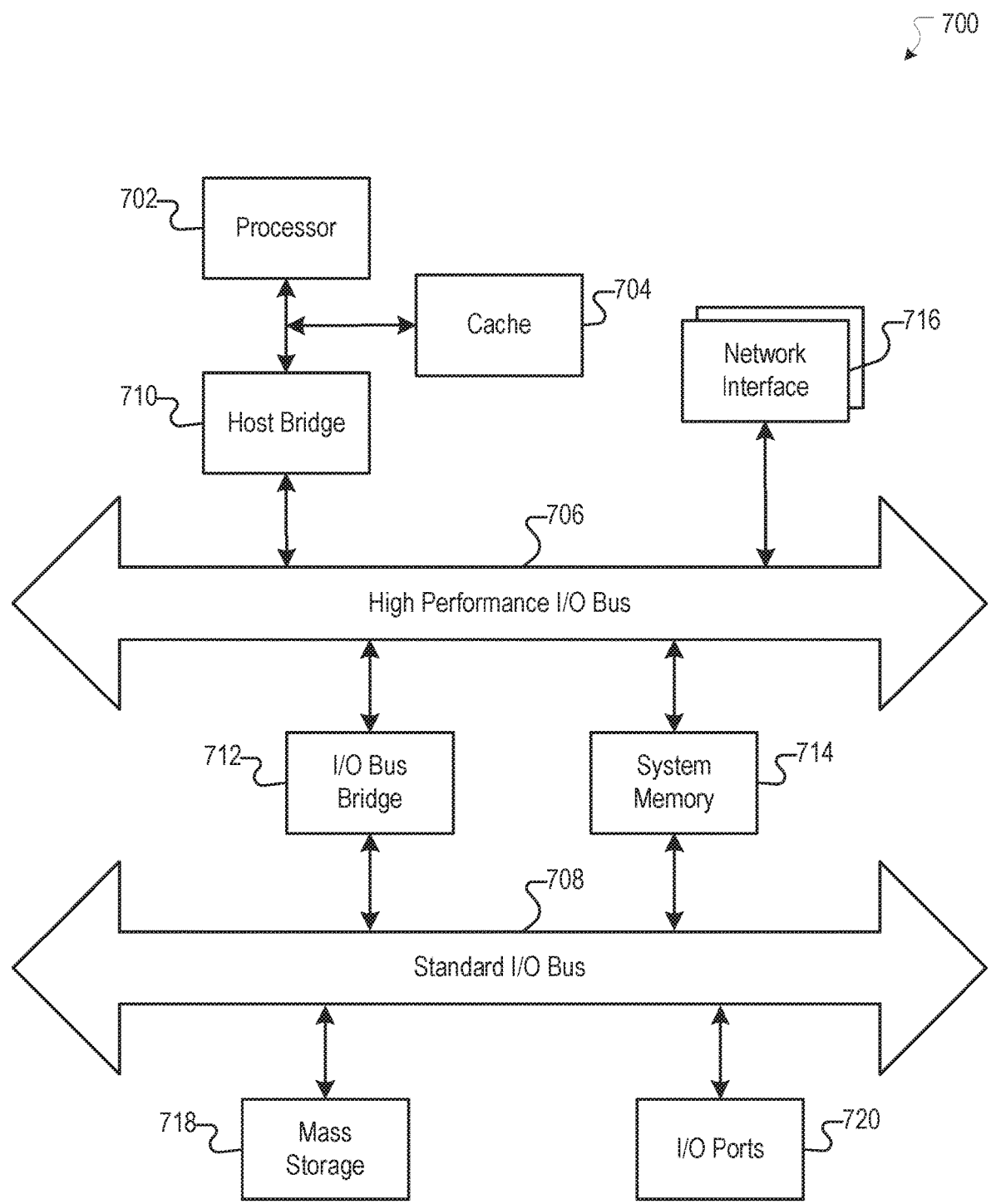
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a set of videos;
   identifying, by the computing system, one or more overlapping portions in the set of videos, wherein the one or more overlapping portions are determined from at least overlapping audio portions;
   generating, by the computing system, a directed acyclic graph based on the one or more overlapping portions determined from at least overlapping audio portions, wherein the directed acyclic graph comprises a plurality of nodes associated with the set of videos and sorted based on start times of the set of videos;
   traversing, by the computing system, the directed acyclic graph based on the one or more overlapping portions determined from at least overlapping audio portions to identify a path of traversal resulting in a longest length for a stitched media content item, wherein the path of traversal comprises a set of nodes of the plurality of nodes, the set of nodes being associated with one or more videos from the set of videos; and
   generating, by the computing system, the stitched media content item based on the path of traversal and at least a subset of the set of videos, wherein the stitched media content item comprises visual content from each video of the one or more videos.

2. The computer-implemented method of claim 1, wherein
   the directed acyclic graph further comprises a plurality of edges connecting the plurality of nodes, and
   an edge of the plurality of edges is associated with an overlapping portion of the one or more overlapping portions.

3. The computer-implemented method of claim 2, wherein a node of the plurality of nodes in the directed acyclic stores length information for its respective associated video, and an edge of the plurality of edges stores length information indicative of a length of an overlap between two connected nodes.

4. The computer-implemented method of claim 1, wherein the identifying the one or more overlapping portions in the set of videos comprises identifying one or more overlapping audio portions in the set of videos.

5. The computer-implemented method of claim 1, wherein the identifying the set of videos comprises identifying a set of related videos.

6. The computer-implemented method of claim 5, wherein each video in the set of related videos is associated with a particular event.

7. The computer-implemented method of claim 6, wherein the identifying the set of related videos further comprises querying a database for videos associated with the particular event.

8. The computer-implemented method of claim 1, wherein each video of the set of videos is a video uploaded by a user to a social networking system.

9. A system comprising:
   at least one processor; and
   a memory storing instructions that, when executed by the at least one hardware processor, cause the system to perform a method comprising:
   identifying a set of videos;
   identifying one or more overlapping portions in the set of videos, wherein the one or more overlapping portions are determined from at least overlapping audio portions;
   generating a directed acyclic graph based on the one or more overlapping portions determined from at least overlapping audio portions, wherein the directed acyclic graph comprises a plurality of nodes associated with the set of videos and sorted based on start times of the set of videos;
   traversing the directed acyclic graph based on the one or more overlapping portions determined from at least overlapping audio portions to identify a path of traversal resulting in a longest length for a stitched media content item, wherein the path of traversal comprises a set of nodes of the plurality of nodes, the set of nodes being associated with one or more videos from the set of videos; and
   generating the stitched media content item based on the path of traversal and at least a subset of the set of videos, wherein the stitched media content item comprises visual content from each video of the one or more videos.

10. The system of claim 9, wherein
    the directed acyclic graph further comprises a plurality of edges connecting the plurality of nodes, and each edge of the plurality of edges is associated with an overlapping portion of the one or more overlapping portions.

11. The system of claim 10, wherein a node of the plurality of nodes in the directed acyclic stores length information for its respective associated video, and an edge of the plurality of edges stores length information indicative of a length of an overlap between two connected nodes/videos.

12. The system of claim 9, wherein the identifying the one or more overlapping portions in the set of videos comprises identifying one or more overlapping audio portions in the set of videos.

13. The system of claim 9, wherein the identifying the set of videos comprises identifying a set of related videos.

14. The system of claim 13, wherein each video in the set of related videos is associated with a particular event.

15. A non-transitory computer-readable storage medium including instructions that, when executed by at least one processor of a computing system, cause the computing system to perform a method comprising:
    identifying a set of videos;
    identifying one or more overlapping portions in the set of videos, wherein the one or more overlapping portions are determined from at least overlapping audio portions;
    generating a directed acyclic graph based on the one or more overlapping portions determined from at least overlapping audio portions, wherein the directed acyclic graph comprises a plurality of nodes associated with the set of videos and sorted based on start times of the set of videos;
    traversing the directed acyclic graph based on the one or more overlapping portions determined from at least overlapping audio portions to identify a path of traversal resulting in a longest length for a stitched media content item, wherein the path of traversal comprises a set of nodes of the plurality of nodes, the set of nodes being associated with one or more videos from the set of videos; and
    generating the stitched media content item based on the path of traversal and at least a subset of the set of videos, wherein the stitched media content item comprises visual content from each video of the one or more videos.

16. The non-transitory computer-readable storage medium of claim 15, wherein
    the directed acyclic graph further comprises a plurality of edges connecting the plurality of nodes, and
    each edge of the plurality of edges is associated with an overlapping portion of the one or more overlapping portions.

17. The non-transitory computer-readable storage medium of claim 16, wherein a node of the plurality of nodes in the directed acyclic stores length information for its respective associated video, and an edge of the plurality of edges stores length information indicative of a length of an overlap between two connected nodes/videos.

18. The non-transitory computer-readable storage medium of claim 15, wherein the identifying the one or more overlapping portions in the set of videos comprises identifying one or more overlapping audio portions in the set of videos.

19. The non-transitory computer-readable storage medium of claim 15, wherein the identifying the set of videos comprises identifying a set of related videos.

20. The non-transitory computer-readable storage medium of claim 19, wherein each video in the set of related videos is associated with a particular event.

* * * * *